2,886,065
VARIABLE ONE-WAY RESTRICTION VALVE

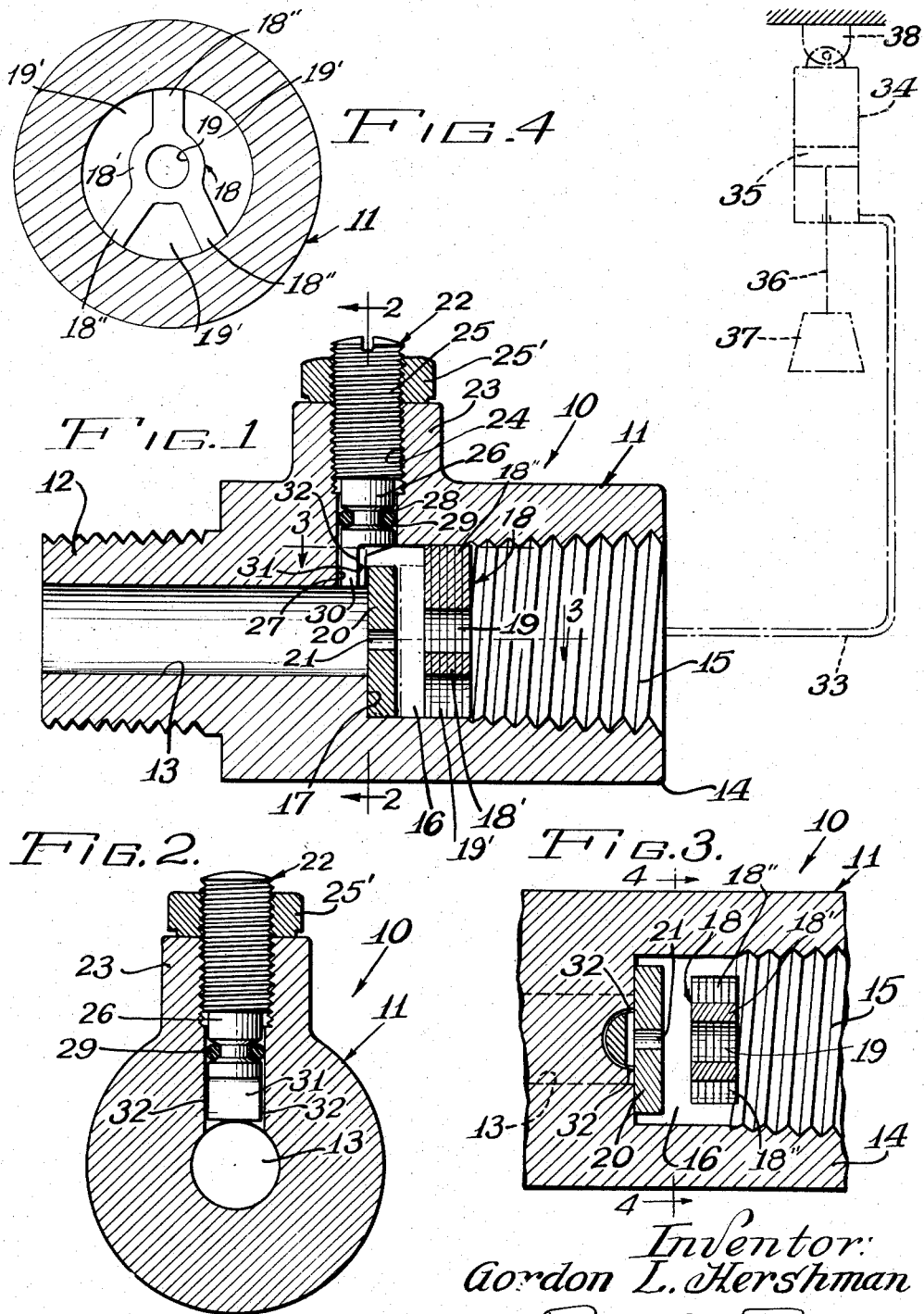

Gordon L. Hershman, Chicago, Ill., assignor to International Harvester Company, a corporation of New Jersey Application August 26, 1955, Serial No. 530,663

2 Claims. (Cl. 138—46)

This invention relates to a valve and more particularly it relates to a valve having adjustable restriction means for regulating the movement of fluid in one direction.

It is a prime object of this invention to provide an improved, simplified valve having a novel adjusting means whereby the flow of fluid through said valve may be controlled.

Still another object of this invention is to provide an improved, flap type or one-way restriction valve, the valve including an adjustable means adapted to position the flap valve in a number of positions for regulating the flow of fluid through said valve.

A still further object is to provide an improved flap type one-way restriction valve, the said valve including an adjustable means having a portion thereon adapted to engage the valve for moving the same to a variety of positions, the said adjusting means including a locking element adapted to securely retain the adjustment and the flap valve in the said number of positions.

These and other objects will become more readily apparent from a reading of the specification when examined in connection with the drawing.

In the drawing:

Figure 1 is a cross sectional view through a one-way restriction valve;

Figure 2 is a cross sectional view taken substantially along the line 2—2 of Figure 1;

Figure 3 is a cross sectional view of a flap valve structure taken substantially along the line 3—3 of Figure 1; and Figure 4 is a cross sectional view taken along the line 4—4 of Fig. 3.

A variable one-way restriction valve is generally designated by the reference character 10 and comprises a body 11 having a first connecting portion 12 adapted to be suitably connected to a source of fluid under pressure (not shown). The first connecting portion 12 comprises a bore 13 and a second connecting portion 14 on the body 11 is provided with an enlarged threaded bore 15 concentric with the bore 13. A valve chamber is designated at 16, the same chamber 16 comprising a valve seat 17. At one end of the valve chamber 16 a fiber insert, or stop 18 is provided. The insert 18 may comprise a plurality of fiber laminations suitably pressed together, the said insert being adapted to be readily inserted within the threaded bore 15 to provide one end of the chamber 16. The insert 18 is of three legged shape as shown in Figures 3 and 4 including a central portion 18' and three legs 18''. The insert 18 includes an opening 19 in the central portion 18'. By virtue of the triangular spaced character of the legs 18'', openings 19' are established to provide for communication between the chamber 16 and the bore 15.

A flap or disk type of valve 20 is positioned within the chamber 16 adjacent the valve seat 17. The valve 20 may be loosely positioned within the said chamber 16 being restricted in its movement by the insert 18. The valve 20 is also provided with a restricted opening 21.

An adjusting member is generally designated at 22, the adjusting member 22 being positioned on a T-projection 23 extending perpendicular to the bores 13 and 15. A threaded bore 24 is provided in the projection 23 and the adjusting member 22 comprises a setscrew 25 which is threaded within the bore 24. A jam nut 25' is adapted to lock the setscrew 25 in position. The setscrew 25 also includes a reduced diameter portion 26 which is positioned within a reduced diameter bore 27 communicating with the bore 13 and also with the bore 15. An annular groove 28 is provided at one end of the reduced diameter portion 26, the said groove 28 having an O-ring 29 positioned therein to provide a suitable seal between the bore 27 and the threaded bore 24.

The setscrew 25 is further provided with an extension 30 which is a continuation of the reduced diameter portion 26. The extension 30 has a substantially flat portion 31 positioned in offset relation with respect to the axis of the setscrew 25. The flat portion 31 includes a pair of laterally spaced projecting edges 32, these edges being positioned on opposite ends of the flat portion 31.

A conduit 33 is schematically shown in communication with the bore 15. The conduit 33 is connected to a cylinder 34 having a piston 35 reciprocally positioned therein. The piston 35 comprises an arm 36 to which a weight 37 is connected. The cylinder 34 may be suitably connected as indicated at 38 to suitable supporting structure. Assuming now that fluid under pressure is pumped from a suitable source through the bore 13, through the openings 19 and 19' and through the bore 15 to the cylinder 34. When the fluid is flowing in this direction toward the conduit 33 the flap valve 20 is forced against the insert 18, as shown in Figure 1, by the dotted lines. Since this valve 20 is smaller in diameter than the diameter of the chamber 16, fluid may easily flow to the conduit 33 through the openings 19'. Upon this occurrence, of course, the piston 35 moves upwardly to the upper end of the cylinder 34. The weight 37 can represent any type of object which is sought to be lowered at a specified rate or degree. Thus it might represent a farm implement which is sought to be lowered for accomplishing a specific purpose, the rate of lowering being constant. The weight, of course, can represent any number of different objects wherein the object is raised and then is lowered upon the fluid flow through the valve in an opposite direction. Thus, assuming now that the pressure of fluid is against the underneath side of the piston 35, the piston 35 raises upwardly. The pressure source is now shut off and liquid is permitted to flow in an opposite direction, initially going through the bore 15, through the openings 19 and 19' and 21 and to the bore 13 whereupon it returns to its original source. It can be seen that the bore 21 of the flap 20 permits a certain restricted flow thereby lowering the weight 37 at a certain consistent rate of speed. It is also apparent that a certain amount of fluid may escape through an open portion provided between the flat portion 31 and the upper end of the flap valve 20.

The operator may now wish to make various adjustments of the flap valve 20 to permit an increased rate of descent of the weight 37 whereby the flow of fluid is increased through the bores 15 and 13. He accomplishes this by simply turning the setscrew 22 whereupon one of the edges 32 is brought into engagement with the flap valve 20. By turning the setscrew 25 a certain degree, the flap valve 20 is pivoted to move partially free of the valve seat 17 and the flow of fluid is increased through the bores 15 and 13. In view of the eccentric or offset relation of the flat portion 31 the flap valve may be moved to a completely open position, as shown by the dotted line position of the flap valve in Figure 1. The O-ring 28 suitably serves to prevent the escape of liquid through the threaded bore 24. The setscrew 25 may be locked in a number of positions by simply tightening the jam nut 25'. Thus it is apparent that the flap valve may have minute adjustments by simply turning the setscrew 25 the desired degree.

It is thus readily apparent that an improved and simplified one-way restriction valve has been provided, the said valve including fine adjusting means whereby a flap valve may be moved to a variety of positions and locked in said position to control the flow of fluid in one direction through the valve. Thus the objects of the invention have been fully achieved and it must be understood that changes may be made without departing from the spirit of the invention as disclosed or the scope of the appended claims.

What is claimed is:

1. A valve comprising a body having a first bore, a valve seat at one end of said bore within said body, a valve chamber within said body adjacent said seat, said chamber communicating with said bore, a conduit connection in communication with said chamber, said body including a second bore extending laterally with respect to said first bore and communicating therewith, an insert within said body disposed between said conduit connection and said chamber, said insert having an opening means communicating with the chamber and the connection, a valve flap member disposed within said chamber between said valve seat and said insert, said valve flap member having an opening of less cross sectional area than the cross sectional area of said first bore and being positioned during the flow of fluid in one direction through said conduit and bore to seat against the valve seat for limiting the flow therethrough, said valve flap member being displaceable from said valve seat in response to fluid pressure during the flow of fluid in a second direction, said opening means being unrestricted relative to the first bore to permit the free flow of fluid, means for regulating the valve flap member to control the flow of fluid in the first direction comprising an adjusting member rotatably positioned in said second bore, said adjusting member having a reduced diameter portion adjacent said first bore, an extension on said reduced diameter portion, said extension having a relatively flat portion disposed in offset relation with respect to the axis of said adjusting member, said flat portion being positioned to engage said valve flap member during rotation to displace said valve member from the valve seat and move the same to a plurality of positions thereby controlling the flow of fluid in the first direction, and means connected to said adjusting member for locking the same against rotation.

2. A valve comprising a body having a first bore, a valve seat at one end of said bore within said body, a valve chamber within said body adjacent said seat, said chamber communicating with said first bore, a valve flap member in said chamber, a conduit connection in communication with said chamber, said body including a second bore extending laterally with respect to said valve flap member disposed in said chamber, said valve flap member having an opening of less cross sectional area than said first bore, said chamber and said conduit connection being positioned during the flow of fluid in one direction through said conduit connection to seat against said valve seat for limiting flow therethrough whereby a limited flow of fluid flows through the opening of said valve flap member to said first bore, said valve flap member being displaceable from said valve seat in response to fluid pressure during the flow of fluid in a second direction to permit the free flow of fluid from said first bore to said chamber, a stop element positioned between said conduit connection and said chamber and engaged by said valve flap member during the flow of fluid in the second direction to limit movement of said valve flap member within said chamber, said stop having less area than the cross sectional area of said conduit connection and said chamber to provide for the free flow of fluid therebetween, means for regulating the valve flap member to control the flow of fluid in the first direction comprising an adjusting member rotatably positioned in said second bore, said adjusting member having a reduced diameter portion adjacent said first bore, an extension on said reduced diameter portion, said extension having a relatively flat portion disposed in offset relation with respect to the axis of said adjusting member, said flat portion being adapted to engage said valve flap member during rotation to displace said valve flap member from the valve seat and move the same to a plurality of positions thereby controlling the flow of fluid in the first direction, and means connected to said adjusting member for locking the same against rotation.

References Cited in the file of this patent

UNITED STATES PATENTS

| | | |
|---|---|---|
| 702,157 | Schreidt | June 10, 1902 |
| 744,625 | Sarver | Nov. 17, 1903 |
| 1,165,230 | Degen | Dec. 21, 1915 |
| 1,726,885 | Burnett | Sept. 3, 1929 |
| 1,781,366 | Campula | Nov. 11, 1930 |
| 1,915,553 | Shindel | June 27, 1933 |
| 2,144,228 | Penick | Jan. 17, 1939 |
| 2,220,620 | Capen | Nov. 5, 1940 |
| 2,684,079 | Krohm | July 20, 1954 |

FOREIGN PATENTS

| | | |
|---|---|---|
| 1,678 | Great Britain | of 1879 |